(12) United States Patent
Tse

(10) Patent No.: US 6,643,864 B1
(45) Date of Patent: Nov. 11, 2003

(54) SWITCHING DEVICE FOR CONNECTING A SHOWER HEAD TO A WATER PIPE OR HOSE

(76) Inventor: Hing Fai Gary Tse, Room 1908-11, 19/F, Telford House, 16 Wang Hoi Road, Kowloon Bay, Kowloon, Hong Kong (CN)

( * ) Notice: Subject to any disclaimer, the term of this patent is extended or adjusted under 35 U.S.C. 154(b) by 0 days.

(21) Appl. No.: 10/272,205

(22) Filed: Oct. 8, 2002

(51) Int. Cl.[7] ................................................. B05B 1/00
(52) U.S. Cl. ........................... 4/615; 239/579; 251/353
(58) Field of Search ........................... 4/615; 239/579; 251/349, 353

(56) References Cited

U.S. PATENT DOCUMENTS 1,080,273 A  * 12/1913 Fountain ..................... 251/353
2,237,469 A  *  4/1941 Bender ..................... 251/353 X
3,219,278 A  * 11/1965 Santarelli ..................... 239/579
6,196,477 B1 *  3/2001 Halltorp et al. ............. 239/579

* cited by examiner

Primary Examiner—Robert M. Fetsuga

(57) ABSTRACT

The present invention relates to a switching device which connects a shower head to a water pipe or hose and enables a user to allow or stop water flowing through the shower head without controlling the faucet. The switching device comprises a casing which is screwed to a shower head, a cylindrical inner pipe which is placed inside the casing, a rubber packing which is placed in between the inner pipe and the casing, a cylindrical center pipe which is placed inside the inner pipe and is screwed to the water pipe or hose, certain gaskets which are placed in the grooves on the center pipe's surface, a fixing ring which is placed on top of the inner pipe, certain cylindrical pieces which penetrate through the fixing ring, the inner pipe and insert into the casing and a sealing cover which is screwed to the casing.

1 Claim, 3 Drawing Sheets

SWITCHING DEVICE FOR CONNECTING A SHOWER HEAD TO A WATER PIPE OR HOSE

BACKGROUND OF THE INVENTION

The present invention relates to water pipe or hose junctions and more particularly pertains to a new switching device for connecting a shower head to a water pipe or hose enabling a user to allow or stop water flowing through the shower head without controlling the faucet.

The available junctions in the marketplace only connect the shower heads to the pipes or hoses of water supply and do not serve as switches to control the water supply. During showering, hands are usually filled with soap foam which leaves dirty markings on the faucet. It is very troublesome to clean up the dirty markings on the faucet each time after showering. To elderly people, it is difficult for them to bend to turn on or off the faucet so as to control the water supply during showering. Where the faucet is located far away from the shower head, it is inconvenient to control the water supply by turning on or off the faucet.

BRIEF SUMMARY OF THE INVENTION

In view of the aforesaid disadvantages now present in the prior art, the present invention provides a new switching device which connects a shower head to a water pipe or hose and enables a user to allow or stop water flowing through the shower head by pushing or pulling the shower head without controlling the faucet.

To attain this, the present invention generally comprises a casing which has a flange inside, a thread outside at its bottom end corresponding with that on the shower head to which it is screwed and a thread at its inside top to which a sealing cover with a corresponding thread is screwed; a cylindrical inner pipe which is placed inside the casing and has at least two nozzles on its surface and an outward flange at the top; a rubber packing which is placed in between the outward flange of the inner pipe and the flange of the casing; a cylindrical center pipe which can be inserted into the inner pipe and moved up and down and has at least two nozzles on its surface corresponding with those on the inner pipe and for each nozzle there are two grooves on the surface of the center pipe, one vertically above the nozzle and one vertically below the nozzle, and it has a thread inside at its upper end corresponding with that on the water hose or pipe to which it is screwed and at least two vertical guiding troughs outside at its upper end; at least four gaskets which are placed in the grooves on the surface of the center pipe; a fixing ring which is placed on top of the outward flange of the inner pipe and has protrusions in position corresponding to the vertical guiding troughs of the center pipe; at least two cylindrical pieces which penetrate through the fixing ring and the outward flange of the inner pipe and insert into the flange of the casing; and a sealing cover which has a thread corresponding to the thread at the inside top of the casing to which it is screwed and is fixed in between the upper part of the center pipe and the upper end of the casing pressing downwards against the top of the fixing ring.

When the shower head is pushed upwards, the inner pipe together with the casing slides upwards along the vertical guiding troughs of the center pipe and the nozzles on the surface of the inner pipe corresponds with those on the surface of the center pipe so that water can pass through and supply water to the shower head. When the shower head is pulled downwards, the inner pipe together with the casing slides downwards along the vertical guiding troughs of the center pipe and the nozzles on the surface of the inner pipe do not correspond with those on the surface of the center pipe so that water flow is blocked and no water is supplied to the shower head.

It is an object of the present invention to provide a new switching device which allows water flowing through the shower head by pushing up the shower head and stops water flowing through the shower head by pulling down the shower head.

It is another object of the present invention to provide a new switching device which is of simple and reliable construction.

It is a further object of the present invention to provide a new switching device which is susceptible of a low cost of manufacture with regard to both materials and labor, and which accordingly is then susceptible of low prices of sale to the consuming public, thereby making such switching device economically available to the buying public.

An even further object of the present invention is to provide a new switching device which enables a user to allow or stop water flowing through the shower head by pushing or pulling the shower head without controlling the faucet, thus overcoming the disadvantages of the prior art.

BRIEF DESCRIPTION OF THE DRAWINGS

FIG. 4 shows the external side view of the switching device when water is allowed to flow through.

FIG. 5 shows the external side view of the switching device when water is stopped from flowing through.

DETAILED DESCRIPTION OF THE INVENTION

Figure 1:
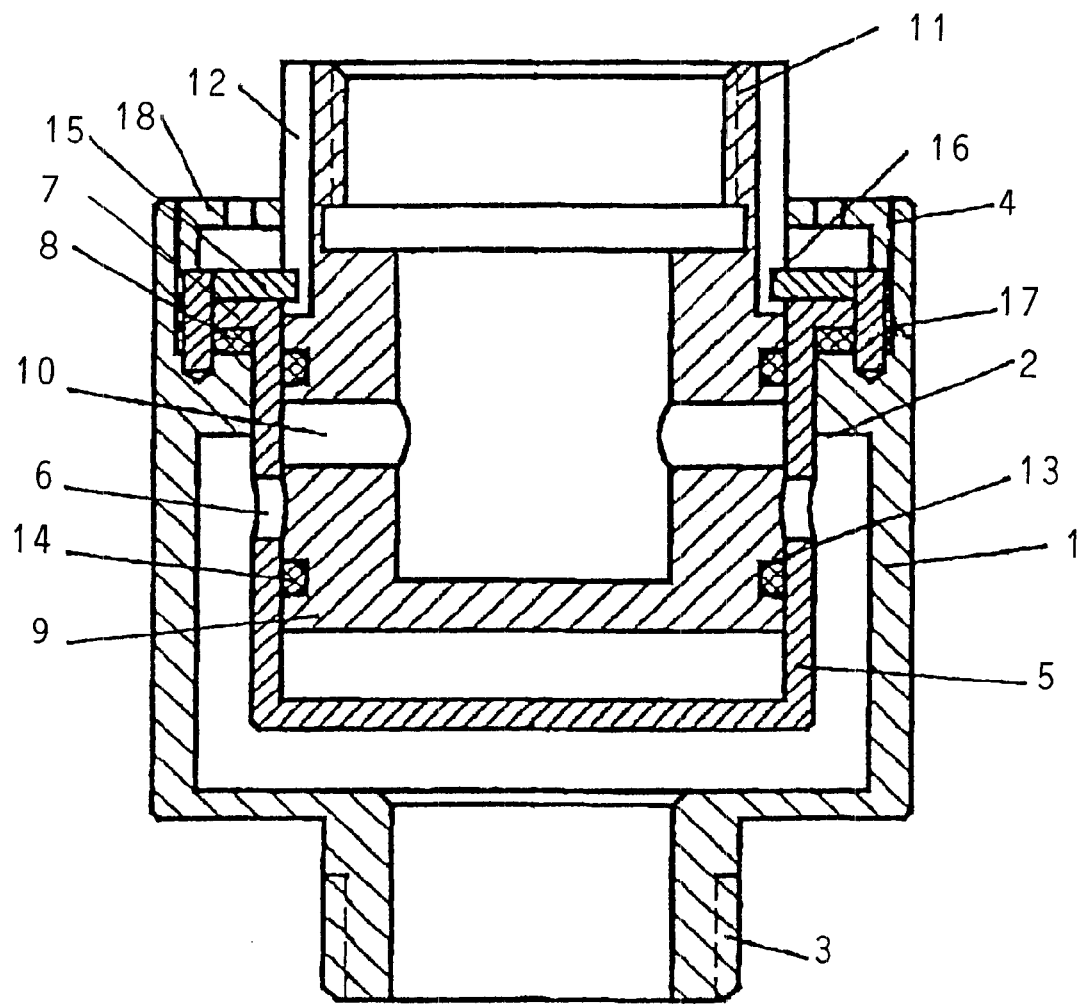
FIG. 1 shows the cross-sectional view of a switching device.
Figure 2:
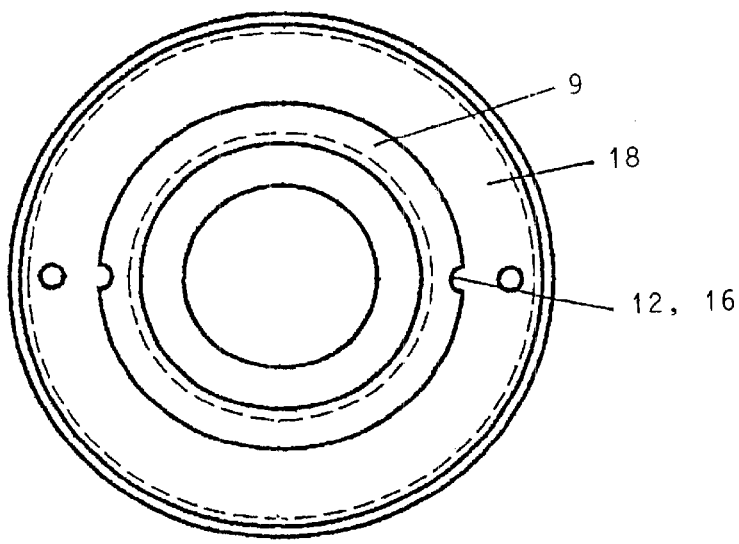
FIG. 2 shows the top plan view of the switching device.
Figure 3:
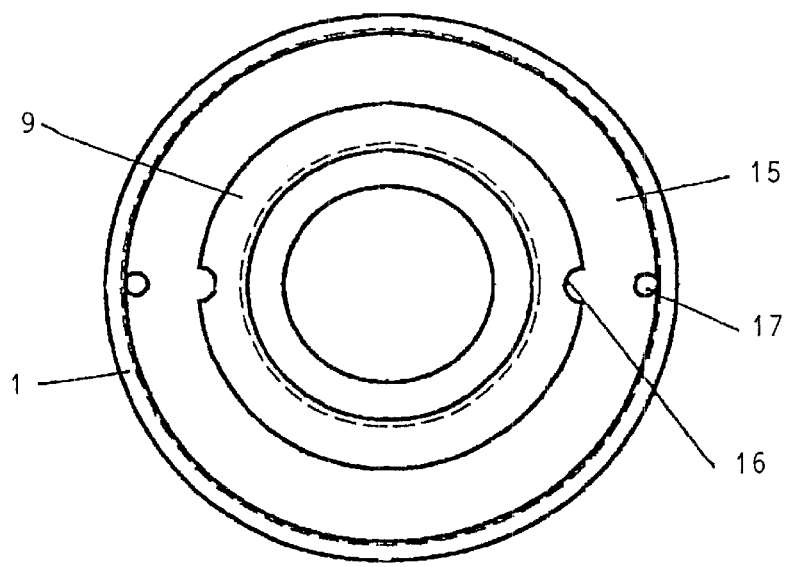
FIG. 3 shows the top plan view of the switching device after the sealing cover is removed.
Figure 4:
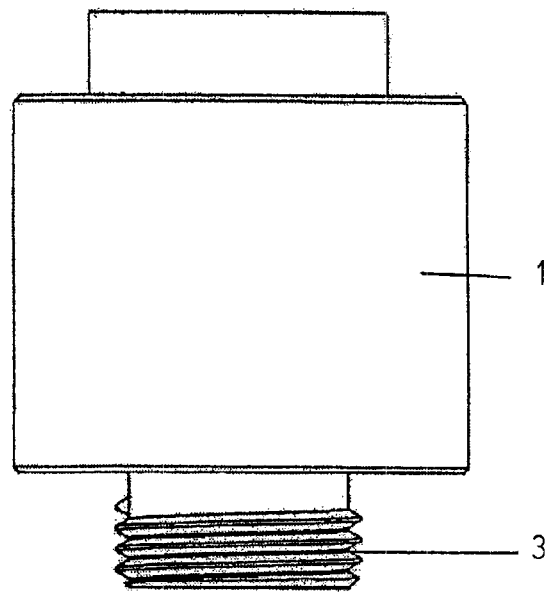
Figure 5:
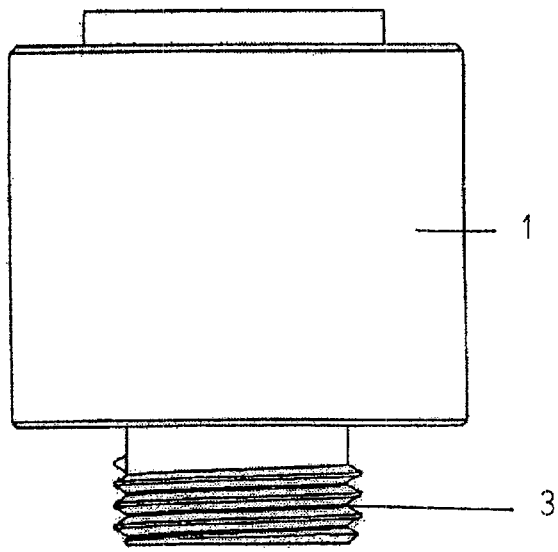

As illustrated in FIGS. 1 to 5, the switching device generally comprises a casing 1, an inner pipe 5, a rubber packing 8, a center pipe 9, at least four gaskets 14, a fixing ring 15, at least two cylindrical pieces 17 and a sealing cover 18.

The casing 1 has a flange 2 inside and a thread 3 outside at its bottom end corresponding with that on the shower head to which it is screwed. At its inside top, there is a thread 4 to which the sealing cover 18 with a corresponding thread is screwed.

The inner pipe 5 is cylindrical in shape with an outward flange 7 at its top and has at least two nozzles 6 on its surface. The inner pipe 5 is placed inside the casing 1 with the rubber packing 8 in between.

The rubber packing 8 is placed in between the flange 2 of the casing 1 and the outward flange 7 of the inner pipe 5.

The center pipe 9 is cylindrical in shape which can be inserted into the inner pipe 5 and moved up and down and has at least two nozzles 10 on its surface corresponding with the nozzles 6 on the inner pipe. For each nozzle 10, there are two grooves 13 on the surface of the center pipe 9, one vertically above the nozzle 10 and one vertically below the nozzle 10. The center pipe 9 has a thread 11 inside at its upper end corresponding with that on the water hose or pipe to which it is screwed and has at least two vertical guiding troughs 12 outside at its upper end.

One gasket 14 is placed in each of the grooves 13 on the surface of the center pipe 9.

The fixing ring 15 is placed on top of the outward flange 7 of the inner pipe 5 and has protrusions 16 in position corresponding to the vertical guiding troughs 12 of the center pipe 9.

The cylindrical pieces 17 penetrate through the fixing ring 15 and the outward flange 7 of the inner pipe 5 and insert into the flange 2 of the casing 1.

The sealing cover 18 has a thread corresponding to the thread 4 at the inside top of the casing 1 to which the sealing cover 18 is screwed and is fixed in between the upper part of the center pipe 9 and the upper end of the casing 1 pressing downwards against the top of the fixing ring 15.

When the shower head is pushed upwards, the inner pipe 5 together with the casing 1 slides upwards along the vertical guiding troughs 12 of the center pipe 9 and the nozzles 6 on the surface of the inner pipe 5 corresponds with the nozzles 10 on the surface of the center pipe 9 so that water can pass through and supply water to the shower head. When the shower head is pulled downwards, the inner pipe 5 together with the casing 1 slides downwards along the vertical guiding troughs 12 of the center pipe 9 and the nozzles 6 on the surface of the inner pipe 5 do not correspond with the nozzles 10 on the surface of the center pipe 9 so that water flow is blocked and no water is supplied to the shower head.

As to a further discussion of the manner of usage and operation of the present invention, the same should be apparent from the above description. Accordingly, no further discussion relating to the manner of usage and operation is provided.

With respect to the above description, it is to be realized that the optimum relationships for the parts of the invention in regard to size, shape, form, materials, function and manner of operation, assembly and use are deemed readily apparent and obvious to those skilled in the art, and all equivalent relationships to those illustrated in the drawings and described in the specification are intended to be encompassed by the present invention.

The present invention is capable of other embodiments and of being practiced and carried out in various ways. It is to be understood that the phraseology and terminology employed herein are for the purpose of description and should not be regarded as limiting.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to falling within the scope of the invention.

What is claimed is:

1. A switching device for connecting a shower head to a water pipe or hose comprising:

a casing which has a flange inside, a thread outside at its bottom end corresponding with that on the shower head to which it is screwed and a thread at its inside top to which a sealing cover with a corresponding thread is screwed;

a cylindrical inner pipe which is placed inside the casing and has at least two nozzles on its surface and an outward flange at the top;

a rubber packing which is placed in between the outward flange of the inner pipe and the flange of the casing;

a cylindrical center pipe which can be inserted into the inner pipe and moved up and down and has at least two nozzles on its surface corresponding with those on the inner pipe and for each nozzle there are two grooves on the surface of the center pipe, one vertically above the nozzle and one vertically below the nozzle, and it has a thread inside at its upper end corresponding with that on the water hose or pipe to which it is screwed and it has at least two vertical guiding troughs outside at its upper end;

at least two gaskets which are placed in the grooves on the surface of the center pipe;

a fixing ring which is placed on top of the outward flange of the inner pipe and has protrusions in position corresponding to the vertical guiding troughs of the center pipe;

at least two cylindrical pieces which penetrate through the fixing ring and the outward flange of the inner pipe and insert into the flange of the casing; and a sealing cover which has a thread corresponding to the thread at the inside top of the casing to which it is screwed and is fixed in between the upper part of the center pipe and the upper end of the casing pressing downwards against the top of the fixing ring.

* * * * *